US012654602B2

(12) United States Patent　　　　　(10) Patent No.:　US 12,654,602 B2

Heisey et al.　　　　　　　　　　　　　(45) Date of Patent:　　Jun. 16, 2026

(54) CHILD RESTRAINT

(71) Applicant: Dorel Juvenile Group, Inc., Foxboro, MA (US)

(72) Inventors: Nathan W. Heisey, Seymour, IN (US); Icy Feng, ZhongShan (CN)

(73) Assignee: Dorel Juvenile Group, Inc., Foxboro, MA (US)

( * ) Notice: Subject to any disclaimer, the term of this patent is extended or adjusted under 35 U.S.C. 154(b) by 132 days.

(21) Appl. No.: 18/590,249

(22) Filed: Feb. 28, 2024

(65) Prior Publication Data

US 2024/0286534 A1　　　Aug. 29, 2024

Related U.S. Application Data

(60) Provisional application No. 63/448,802, filed on Feb. 28, 2023.

(51) Int. Cl.
B60N 2/28　　　　　(2006.01)

(52) U.S. Cl.
CPC ......... B60N 2/2816 (2023.08); B60N 2/2806 (2013.01)

(58) Field of Classification Search
CPC .......................... B60N 2/2816; B60N 2/2806; B60N 2210/40; B60N 2/2869
See application file for complete search history.

(56) References Cited

U.S. PATENT DOCUMENTS

| | | |
|---|---|---|
| 7,901,003 B2 | 3/2011 | Meeker |
| 8,272,689 B2 | 9/2012 | Biaud |

| | | | |
|---|---|---|---|
| 8,322,788 B2 * | 12/2012 | Williams | B60N 2/2821 |
| | | | 297/256.16 |
| 8,593,293 B2 | 11/2013 | Harrison | |
| 8,813,322 B2 | 8/2014 | Novara | |
| 8,950,809 B2 * | 2/2015 | Szakelyhidi | B60N 2/2806 |
| | | | 297/256.16 |
| 9,315,124 B2 * | 4/2016 | Lehman | B60N 2/2806 |
| 9,365,135 B2 | 6/2016 | Carpenter | |
| 9,499,074 B2 * | 11/2016 | Strong | B60N 2/286 |
| 10,023,079 B2 * | 7/2018 | Zhao | B60N 2/2851 |
| 10,710,478 B2 | 7/2020 | Reaves | |
| 10,737,593 B1 * | 8/2020 | Shellenberger | B60N 2/2845 |
| 10,857,916 B2 | 12/2020 | Glerum | |
| 10,897,963 B2 | 1/2021 | Geist | |
| 10,953,774 B2 * | 3/2021 | Maciejczyk | B60N 2/2809 |
| 11,155,187 B2 * | 10/2021 | Anderson | B60N 2/2821 |
| 12,122,269 B2 * | 10/2024 | Mchugh | B60N 2/2863 |
| 2008/0251002 A1 | 10/2008 | Burleigh | |
| 2008/0296944 A1 | 12/2008 | Nakagawa | |

(Continued)

FOREIGN PATENT DOCUMENTS

| | | |
|---|---|---|
| CN | 204077599 U | 1/2015 |
| CN | 212243054 U | 12/2020 |
| EP | 1552993 B1 | 2/2008 |

*Primary Examiner* — Justin M Benedik

(74) *Attorney, Agent, or Firm* — Barnes & Thornburg LLP

(57)　　　　　　　ABSTRACT

A child restraint includes a juvenile seat and a seat base. The juvenile seat is configured to support a child for transportation in a vehicle. The seat base is adapted to rest on a vehicle seat and to secure the juvenile seat to the vehicle seat. The seat base includes a seat-base foundation formed to include a belt path configured to receive an attachment belt to secure the seat base to the vehicle seat. The seat base further includes a belt-installation indicator fixed to the seat-base foundation.

20 Claims, 8 Drawing Sheets

(56)                     References Cited

U.S. PATENT DOCUMENTS

2011/0140491  A1 *   6/2011  Williams  .............  B60N 2/2806
                                                     297/256.16
2023/0039629  A1 *   2/2023  Mchugh  ...............  B60N 2/2851

* cited by examiner

CHILD RESTRAINT

PRIORITY CLAIM

This application claims priority under 35 U.S.C. § 119(e) to U.S. Provisional Patent Application No. 63/448,802, filed Feb. 28, 2023, which is expressly incorporated by reference herein in its entirety.

BACKGROUND

The present disclosure relates to child restraints, and particularly to child restraints adapted to be secured to a vehicle seat. More particularly, the present disclosure relates to a child restraint adapted to be secured to a vehicle seat using an attachment belt.

SUMMARY

According to the present disclosure, a child restraint includes a juvenile seat and a seat base. The juvenile seat is configured to support a child for transportation in a vehicle. The seat base is adapted to rest on a vehicle seat included in the vehicle and to secure the juvenile seat to the vehicle seat. The seat base includes a seat-base foundation formed to include a belt path configured to receive an attachment belt to secure the seat base to the vehicle seat and a belt retainer moveable relative to the seat-base foundation between an opened position spaced from the belt path and a closed position overlying at least a portion of the belt path.

In illustrative embodiments, the seat base further includes a belt-installation indicator fixed to the seat-base foundation and spaced apart from the belt retainer. The belt-installation indicator is configured to display a first indication when attachment belt installation is incomplete and a second indication when attachment belt installation is complete.

In illustrative embodiments, the belt-installation indicator displays the first indication when the attachment belt resides in the belt path and imparts a first load on the belt path less than a predetermined load. The belt-installation indicator displays the second indication when the attachment belt resides in the belt path and imparts a second load on the belt path greater than or equal to the predetermined load to indicate to a user when the attachment belt is installed in the belt path with at least the predetermined load.

In illustrative embodiments, the belt-installation indicator is a first belt-installation indicator and the seat base further includes a second belt-installation indicator. The first belt-installation indicator is located on a first lateral side of the belt retainer. The second belt-installation indicator is located on a second lateral side of the attachment belt retainer opposite from the first belt-installation indicator. Both belt-installation indicators are spaced apart from the belt retainer and can be used with or without the belt retainer depending on the type of attachment belt used to attach the seat base to the vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4A is a perspective view showing the attachment belt separated from the belt path and the belt retainer in an open position relative to the seat-base foundation;

FIG. 4B is a perspective view showing the attachment belt routed across the belt path and the belt retainer in the opened position and showing the belt-installation indicators displaying a first indication to a user to indicate that the attachment belt is loose and installation is incomplete;

FIG. 4C is a perspective view similar to FIG. 4B showing the belt-installation indicators displaying a second indication to indicate to the user that the attachment belt is tight and installation is complete;

FIG. 4D is a perspective view similar to FIG. 4C showing the attachment belt misaligned with the belt path to cause a first belt-installation indicator to display the first indication and a second belt-installation indicator to display the second indication;

FIG. 11A is a perspective view showing the attachment belt routed across and over the belt path and the belt retainer while the belt retainer is in the closed position relative to the seat-base foundation;

FIG. 11B is a perspective view showing the attachment belt routed across and over the belt path and the belt retainer in the closed position and showing the belt-installation indicators displaying the first indication to a user to indicate that the attachment belt is loose and installation is incomplete;

FIG. 11C is a perspective view similar to FIG. 11B showing the belt-installation indicators displaying a second indication to indicate to the user that the attachment belt is tight and installation is complete;

FIG. 11D is a perspective view similar to FIG. 11C showing the attachment belt misaligned with the belt path to cause the first belt-installation indicator to display the first indication and the second belt-installation indicator to display the second indication.

DETAILED DESCRIPTION

Figures 1, 2, 3:
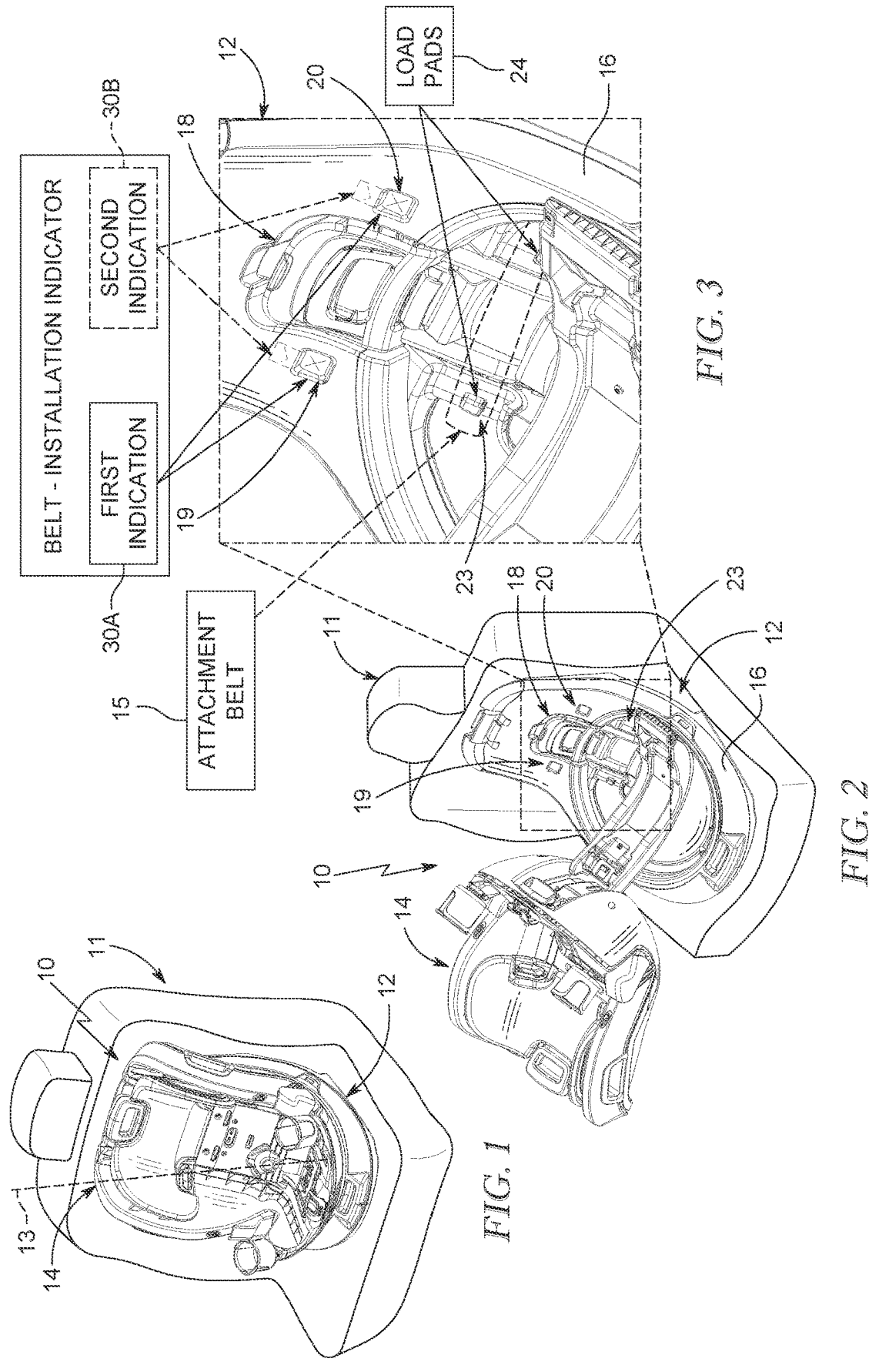
FIG. 1 is a perspective view of a child restraint attached to a vehicle seat and including a seat base secured to the vehicle seat and a juvenile seat mounted to the seat base to secure the juvenile seat to the vehicle seat.
FIG. 2 is a perspective view showing the juvenile seat partially detached from the seat base to expose a belt path used with an attachment belt to secure the seat base to the vehicle seat.
FIG. 3 is an enlarged view of a portion of the seat base showing that the seat base includes a seat-base foundation, a belt retainer coupled to the seat-base foundation, and a pair of belt-installation indicators configured to indicate to a user when installation of the attachment belt on the belt path is complete.

A child restraint 10 includes a seat base 12 adapted to rest on a vehicle seat 11 and a juvenile seat 14 adapted to mount to the seat base 12 to secure the juvenile seat 14 to the vehicle seat as shown in FIG. 1. The seat base 12 includes a seat-base foundation 16, a belt retainer 18, and a pair of belt-installation indicators 19, 20 fixed to the seat-base foundation 16. The seat-base foundation 16 can be attached to the vehicle seat 11 by routing an attachment belt 15 along a belt path 23 formed in the seat-base foundation 16. The attachment belt 15 can be tightened to apply a load on the seat base foundation 16 to block the seat-base foundation 16 from moving relative to the vehicle seat 11 as suggested in FIGS. 4A-4D and FIGS. 11A-11D. When the load applied by the attachment belt reaches a predetermined amount, each belt-installation indicator 19, 20 is configured to visually indicate to a user that the seat base 12 is properly secured to the vehicle seat, as suggested in FIG. 3 and shown in FIG. 4C. The belt-installation indicators 19, 20 also indicated to users when attachment belt 15 installation is incomplete as shown in FIGS. 3 and 4B.

The seat base 12 is adapted to rest on the vehicle seat and to secure the juvenile seat 14 to the vehicle seat 11 as shown in FIGS. 1 and 2. The juvenile seat 14 is configured to rotate relative to the seat base 12 about a vertical axis 13 to reorient the child in either a forward-facing orientation or a rearward facing orientation. The juvenile seat 14 can also be orientated in a sideways orientation and then partially separated from the seat base, as shown in FIG. 2, to expose the belt retainer 18 and the belt path 23 for attachment belt 15 installation.

Figures 4A, 4B, 4C, 4D:
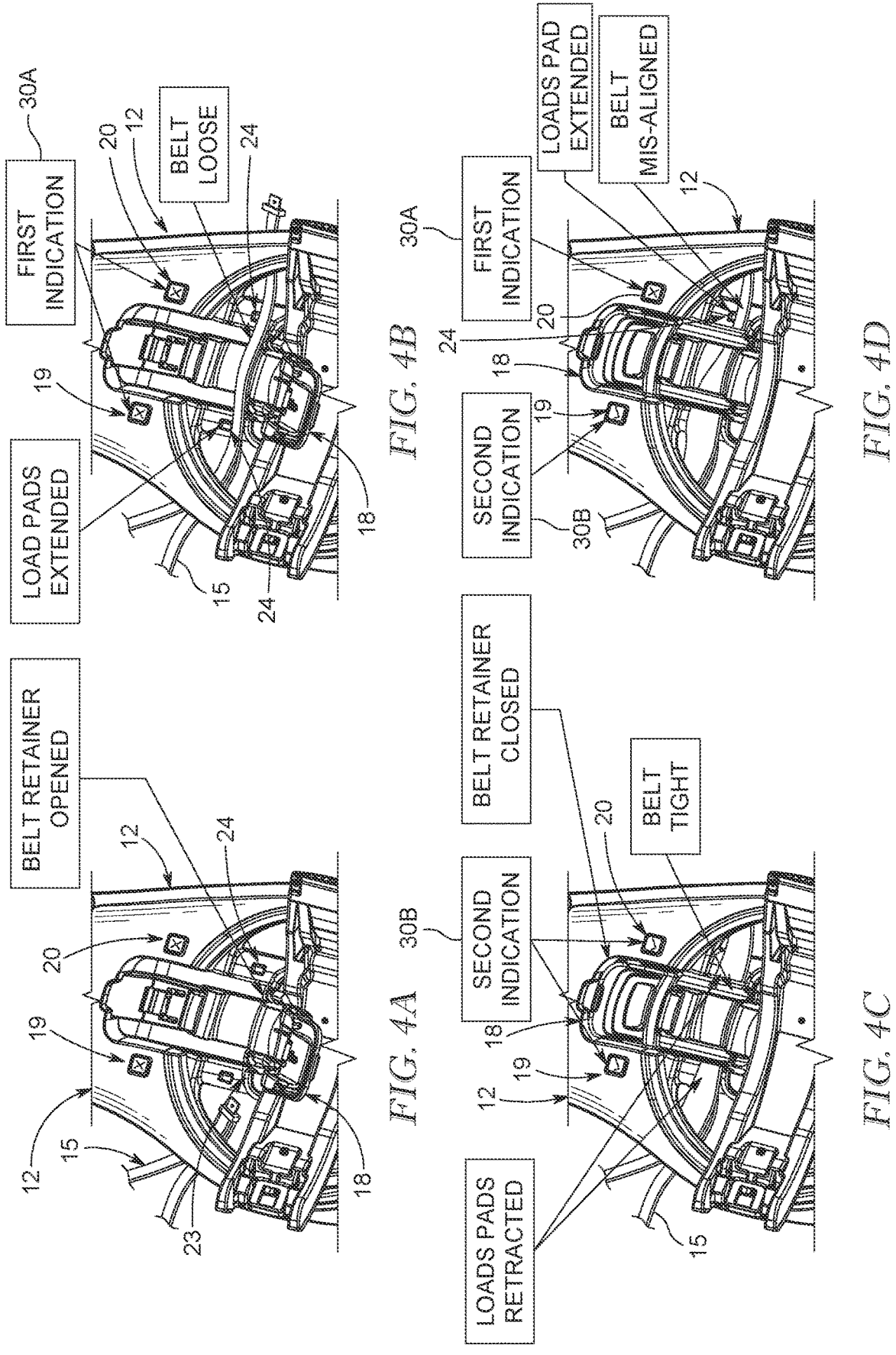
FIGS. 4A-4D are a series of perspective views of a portion of the seat base showing installation of the attachment belt using the belt retainer and showing a change in indications based on a status of the installation of the attachment belt.

The belt retainer 18 is moveable relative to the seat-base foundation 16 between an opened position spaced from the belt path 23, as shown in FIGS. 4A and 4B, and a closed position clamped on the attachment belt 15 to retain the attachment belt 15 to the seat-base foundation 16 as shown in FIGS. 4C and 4D. The belt-installation indicators 19, 20 are configured to display the first indication 30A when the attachment belt 15 resides in the belt path 23 and imparts a first load on the belt path less than a predetermined load while the belt retainer 18 is in the opened position. The belt-installation indicators 19, 20 are configured to display the second indication 30B when the attachment belt 15 resides in the belt path 23 and imparts a second load on the belt path greater than or equal to the predetermined load while the belt retainer 18 is in the opened position. The second indication indicates to a user when the attachment belt 15 is installed in the belt path 23 with at least the predetermined load.

The first belt-installation indicator 19 is located on a first lateral side of the belt retainer 18 while the second belt-installation indicator 20 is located on an opposite, second lateral side of the belt retainer 18 as shown in FIGS. 4A-4D. This arrangement can facilitate load indication and/or attachment belt 15 alignment with the belt path 23 on each lateral side of the belt retainer 18. For example, the first belt-installation indicator 19 may display the second indication 30B while the second belt-installation indicator displays the first indication 30A which would indicate to the user that the attachment belt 15 may be misaligned with at least a portion of the belt path 23 as suggested in FIG. 4D. In some embodiments, the seat base 12 may have only one belt-installation indicator or more than two belt-installation indicators 19, 20.

Figure 5:
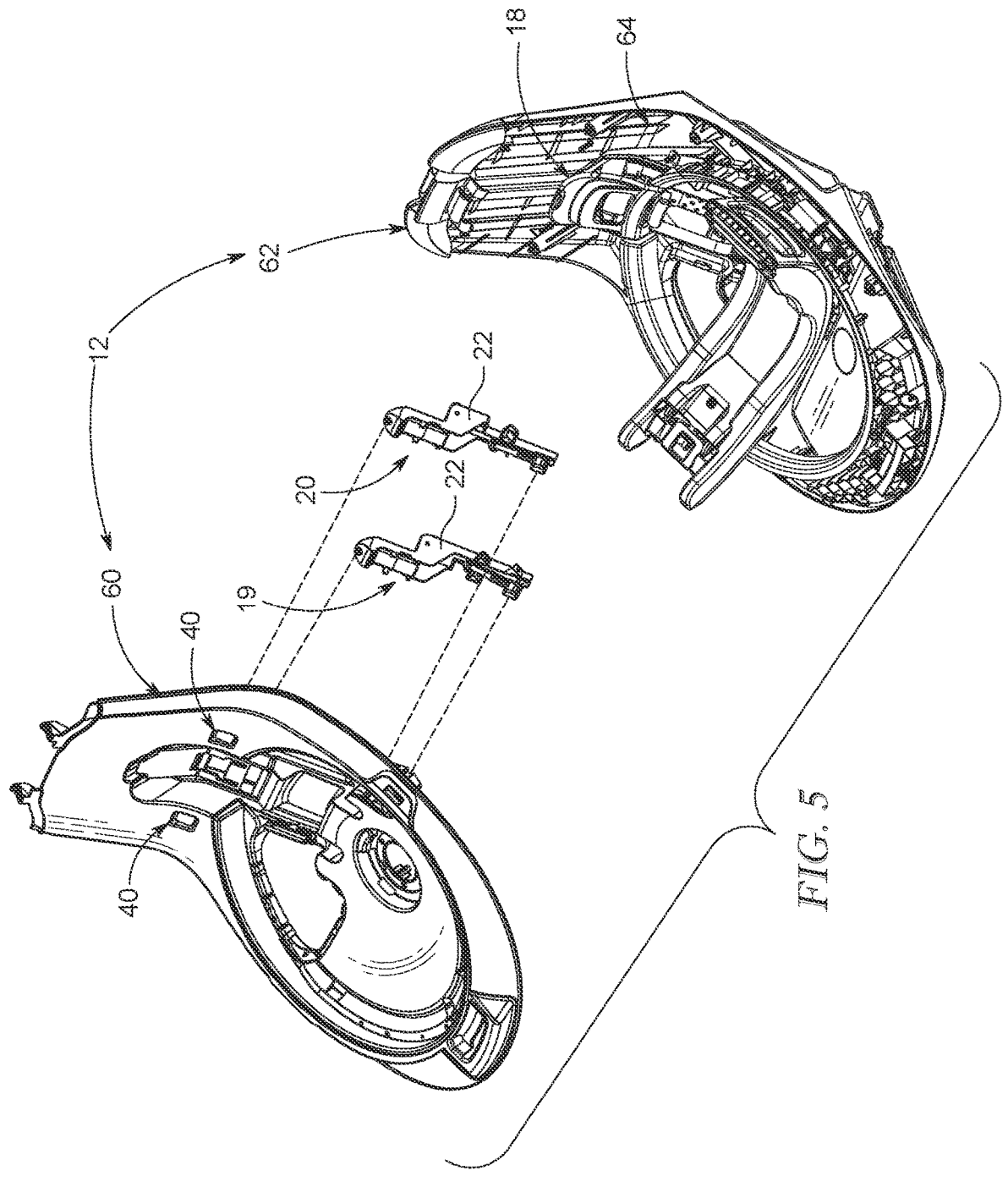
FIG. 5 is an exploded assembly view of the seat base showing that the seat base foundation includes a foundation cover and a foundation base and showing that each belt-installation indicator is formed as an integral unit that is assembled prior to attachment to the seat-base foundation to facilitate and expedite assembly of the seat base.

The seat-base foundation 16 includes a foundation cover 60 and a foundation base 62 as shown in FIG. 5. The foundation cover 60 may be separable from the foundation base during assembly of the child restraint 10 to access and install each of the belt-installation indicators 19, 20. The foundation cover 60 and the foundation base 62 define a foundation interior 64 that houses various structural and mechanical components of the seat base 12 including the belt-installation indicators 19, 20. The foundation cover 60 and the foundation base 62 facilitate assembly of the seat base 12 including the belt-installation indicators 19, 20 on the seat-base foundation 16.

Figure 6:
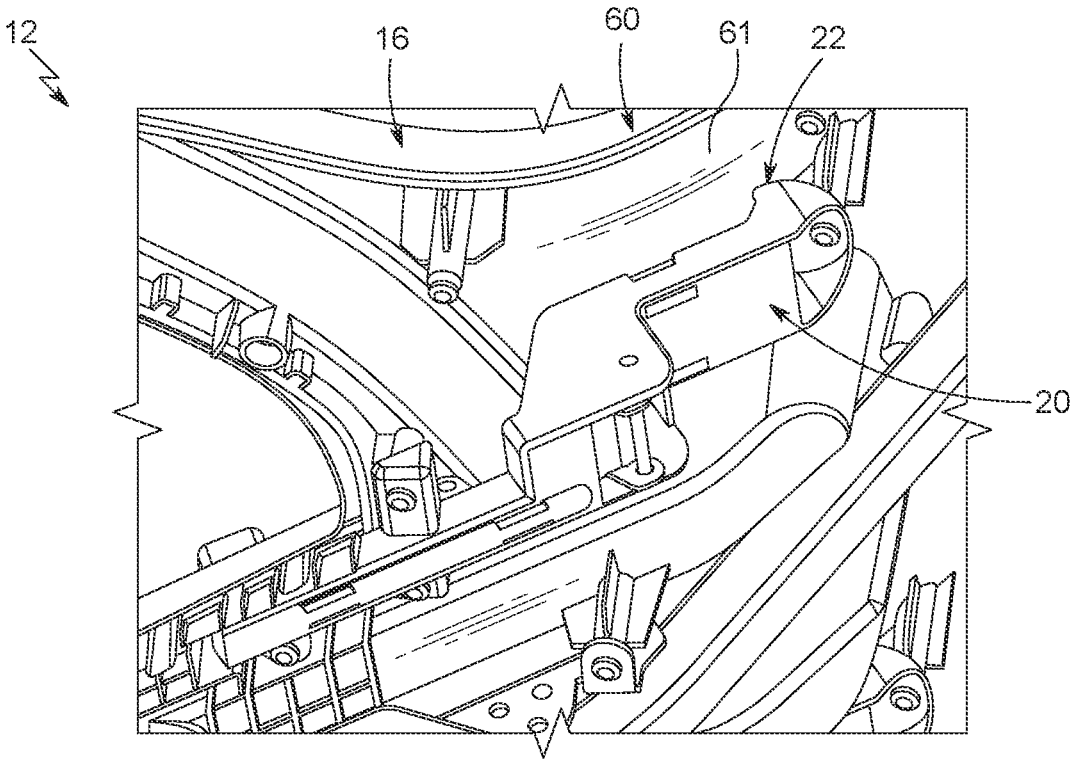
FIG. 6 is an enlarged view of a portion of the foundation cover and one of the belt-installation indicators showing that the belt-installation indicators are configured to attach to an underside of the foundation cover and reside in an foundation interior defined between the foundation cover and the foundation base.

Each belt-installation indicator 19, 20 is configured to be fixed to an underside 61 of the foundation cover 60 of the seat-base foundation 16 as an individual unit as suggested in FIG. 5 and shown in FIG. 6. Each belt-installation indicator 19, 20 includes a housing 22, a tension-status panel 30, and a panel actuator 25. The housing 22 carries the tension-status panel 30 and the panel actuator 25. The housing 22 is attached directly to the foundation cover 60 (i.e. by one or more fasteners) to secure the tension-status panel 30 and the panel actuator 25 in place relative to the seat base foundation 16 as shown in FIG. 6. The tension-status panel 30 and the panel actuator 25 are separable from the housing 22 such that the belt-installation indicators are pre-assembled with the housing 22 to form the individual unit prior to being installed on the foundation cover 60 to facilitate and expedite assembly of the seat base 12. In other embodiments, the housing 22 can be attached to the foundation base 62. In other embodiments, the housing 22 is omitted and the tension-status panel 30 and the panel actuator 25 are attached directly to the seat-base foundation 16.

Figure 7:
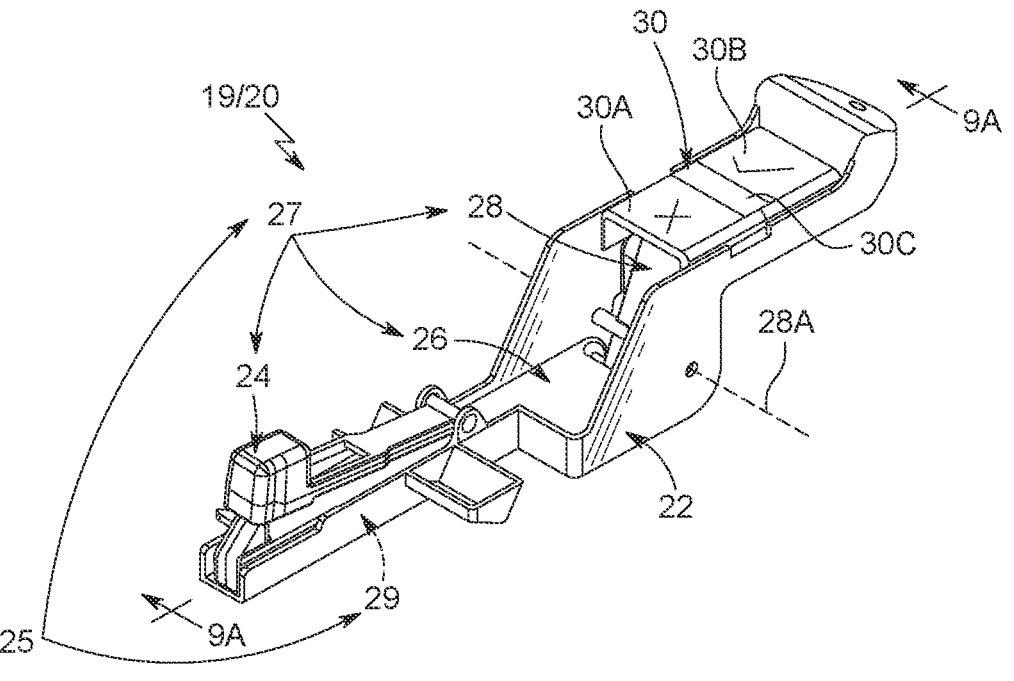
FIG. 7 is a perspective view of one of the belt-installation indicators showing that each belt-installation indicator includes a housing, a tension-status panel configured to provide the first and second indications, and a panel actuator configured to move the tension-status panel between a first position displaying the first indication and a second position displaying the second indication depending on a load provided by the attachment belt.

The tension-status panel 30 includes a first region having the first indication 30A and a second region having the second indication 30B as shown in FIG. 7. The panel actuator 25 is configured to move the tension-status panel 30 relative to the seat-base foundation 16 to expose either the first region having the first indication 30A or the second region having the second indication 30B through a window 40 formed in the foundation cover 60. The first indication 30A may include a first color and/or icon while the second indication 30B may include a second color and/or icon. In one example, the first indication 30A includes a red color and/or a cross-shaped icon to indicate to a user that instal- lation of the attachment belt 15 is incomplete, and the second indication 30B includes a green color and/or a checkmark icon to indicate to a user that installation of the attachment belt 15 is complete. In the illustrative embodi- ment, the belt-installation indicators 19, 20 are configured to display the second indication 30B while the belt retainer 18 is in the opened position to indicate when the attachment belt 15 is aligned with the belt path 23 and has a tensile load of at least a predetermined amount.

In some embodiments, the tension-status panel 30 includes a third region having a third indication 30C differ- ent from the first and second indications 30A, 30B. The third region is between the first and second regions. The third region having the third indication 30C can be exposed through the window 40 to the user to indicate when the attachment belt 15 has the tensile load of at least the predetermined amount, but when the belt retainer 18 is in the opened position. When the belt retainer 18 moves to the closed position, the tension-status panel 30 may again move relative to the seat-base foundation 16 to display the second indication 30B to indicate that the attachment belt 15 has the tensile load of at least the predetermined amount and that the belt retainer 18 is closed. In one example, the third indica- tion 30C includes a different color and/or icon than both the first indication 30A and the second indication 30C. It should be noted that in this instance the terms second indication and third indication can be interchangeable.

The panel actuator 25 includes a panel mover 27 and a bias unit 29 as shown in FIGS. 7-10B. The panel mover 27 is configured to engage the attachment belt 15 in the belt path 23. The panel mover 27 is coupled to the tension-status panel 30 and is configured to move the tension-status panel 30 relative to the window 40 formed in the seat-base foundation 16 in response to the load acting on the panel mover 27 from the attachment belt 15. The panel mover 27 is configured to change from an unactuated state when the attachment belt 15 is separated from the belt path 23 and an actuated state when the attachment belt 15 resides in the belt path 23 and imparts at least the predetermined load on the panel actuator 25 to cause movement of the tension-status panel 30 relative to the window 40. The bias unit 29 is configured to normally urge the panel mover 27 to assume the unactuated state to provide the predetermined load and cause the tension-status panel 30 to normally display the first indication 30A.

The panel mover 27 includes a load pad 24, a slider 26 coupled to the load pad 24, and a actuator lever 28 coupled to the tension-status panel 30 as shown in FIGS. 7-10B. The load pad 24 extends at least partially into the belt path 23 and is configured to engage and receive force from the attach- ment belt 15. The slider 26 is coupled to the load pad 24 and is movable relative to the load pad 24 when the attachment belt 15 is engaged with the load pad 24 with at least the predetermined load to cause the tension-status panel 30 to display the second indication 30B. The actuator lever 28 interconnects the slider 26 and the tension-status panel 30 to transfer movement of the slider 26 to the tension-status panel 30.

Figure 9A:
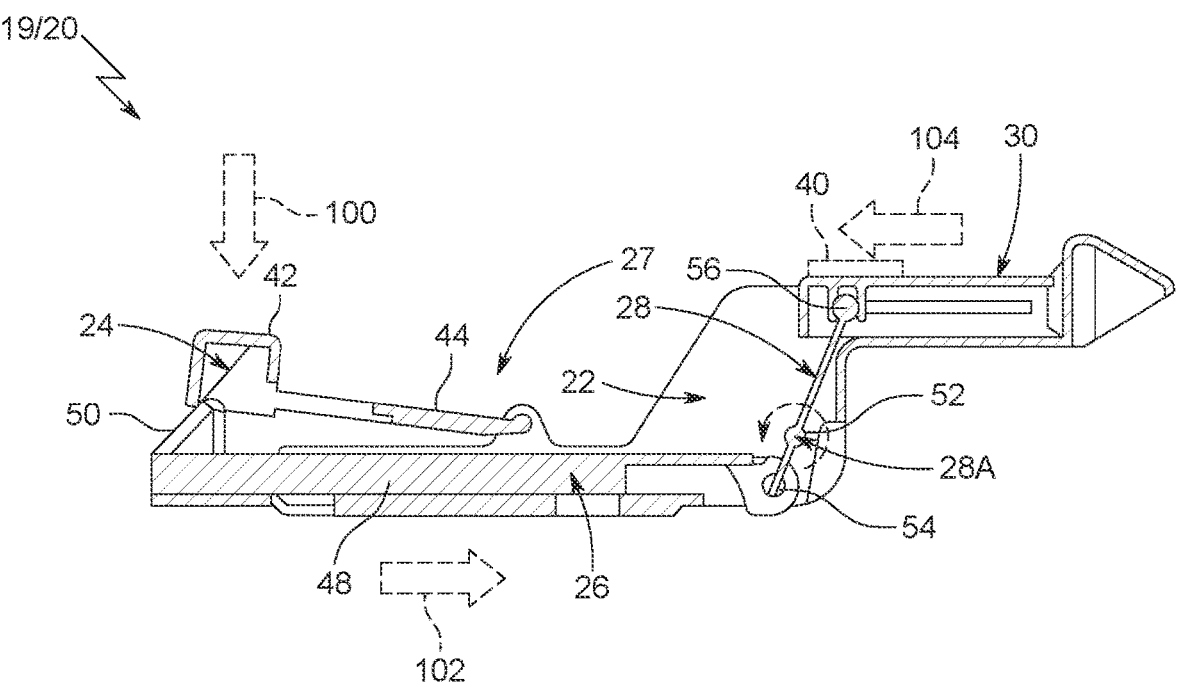
FIG. 9A is a cross section taken along line 9A-9A in FIG. 7 showing the that the panel mover includes a load pad configured to receive a load from the attachment belt, a slider configured to slide in a first direction in response to the load, and an actuator lever coupled to the slider and the tension-status panel and configured to pivot about a lever pivot axis in response to the load to cause the tension-status panel to slide in a second direction opposite the first direction to display the second indication through a window formed in the seat-base foundation.
Figure 9B:
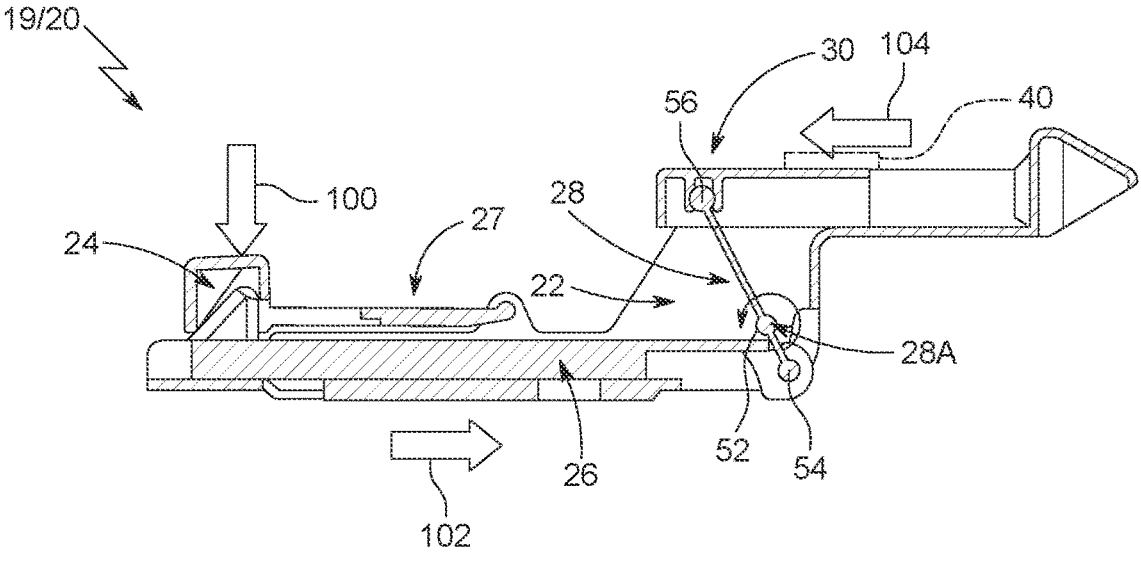
FIG. 9B is a cross section showing the tension-status panel in the second position to display the second indication through the window.
Figures 10A, 10B:
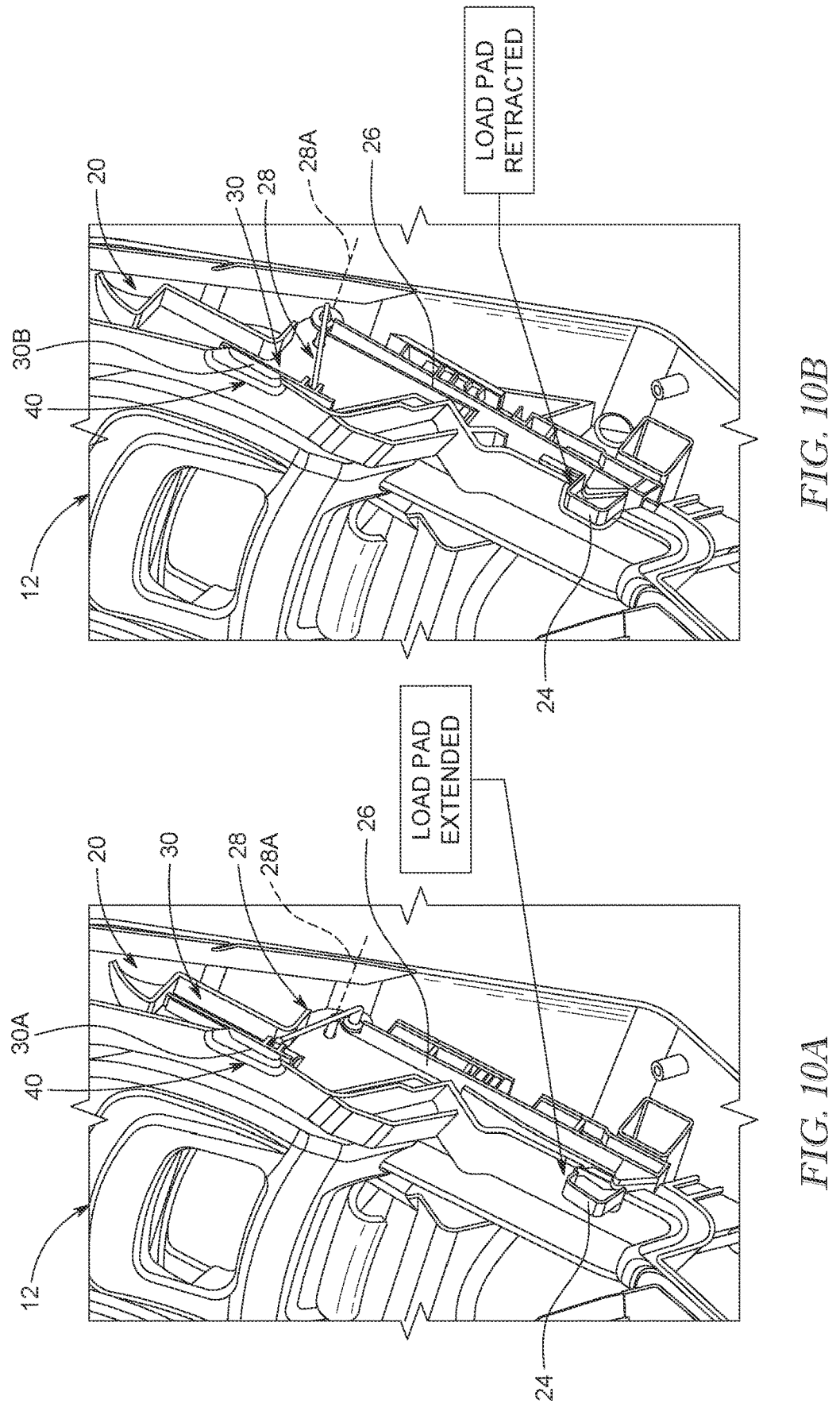
FIG. 10A is a cross section of the seat base showing the tension-status panel displaying the first indication through the window.
FIG. 10B is a cross section of the seat base showing the tension status panel displaying the second indication through the window.

The panel mover 27 is configured to move the tension- status panel 30 as a result of receiving a predetermined load 100 on the load pad 24 from the attachment belt 15 as shown in FIGS. 9A and 9B. The load pad 24 includes a projection 42 that extends into the belt path 23 to engage the attachment belt 15 and a pad arm 44 coupled to the projection 42 and to the housing 22. The projection 42 and the pad arm 44 are pivotable about a load-pad pivot axis 24A between an extended position projecting into the belt path 23 and a retracted position at least partially removed from the belt path 23 in response to the attachment belt 15 engaging the projection 42 and having at least the predetermined load 100.

The slider 26 includes a slider body 48 and an inclined ramp 50 coupled to a first end of the slider body 48 as shown in FIGS. 7-10B. The inclined ramp 50 of the slider 26 is configured to engage the projection 42 as the projection 42 moves toward the retracted position to cause sliding move- ment in a first direction 102 of the slider 26 relative to the seat-base foundation 16.

The actuator lever 28 is pivotable about a lever pivot axis 28A to transfer movement from the slider 26 to the tension- status panel 30 as shown in FIGS. 9A and 9B. The actuator lever includes a pivot axle 52 establishing the lever pivot axis 28A, a slider mount 54 coupled to a second end of the slider 26, and a panel mount 56 coupled to the tension-status panel 30. The pivot axle 52 is located between the slider mount 54 and the panel mount 56. The slider mount 54 moves in the first direction 102 with the slider 26 to cause rotation of the actuator lever 28 about the lever pivot axis 28A. At the same time, the panel mount 56 causes sliding movement of the tension-status panel 30 in an opposite second direction 104. The lever pivot axis 28A is located between a first sliding plane of the slider 26 and a second sliding plane of the tension-status panel 30 such that move- ment of the slider 26 along the first sliding plane in the first direction 102 causes movement of the tension-status panel 30 along the second sliding plane in the second direction, or at least a different direction than the first direction. In some embodiments, the slider 26 is coupled directly to the tension- status panel 30 to cause movement thereof and the actuator lever 28 may be omitted.

Figure 8:
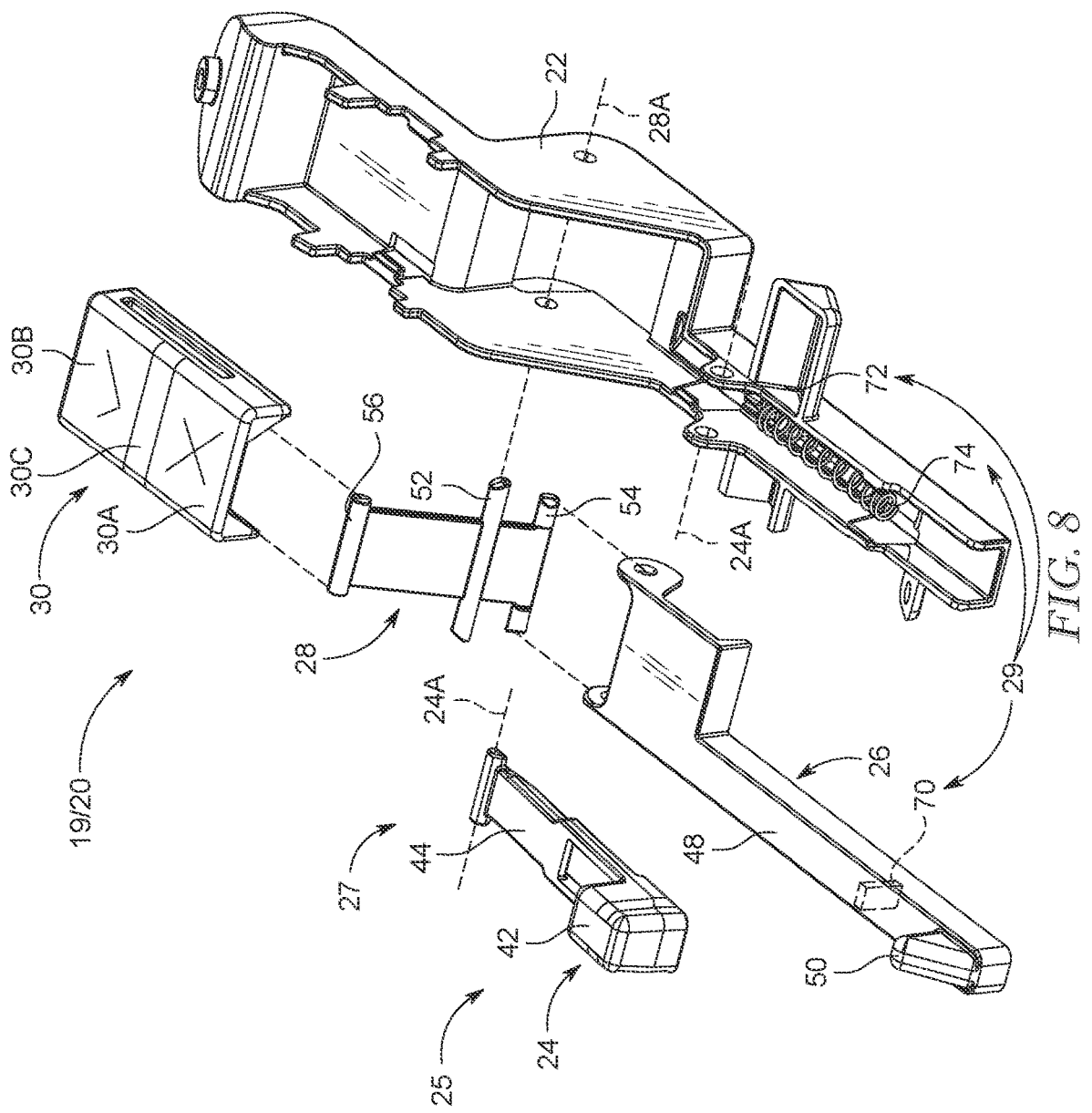
FIG. 8 is an exploded assembly view of the belt-installation indicator shown in FIG. 7 showing that the panel actuator includes a panel mover coupled to the tension-status panel and configured to engage the attachment belt to move the tension-status panel from the first position to the second position when the attachment belt has a predetermined load on the belt path and a bias unit configured to urge the tension-status panel toward the first position to normally display the first indication absent the predetermined load.

The bias unit 29 includes a first spring mount 70 coupled to the slider 26, a second spring mount 72 coupled to the housing 22, and a spring 74 extending between and inter- connecting the first and second spring mounts 70, 72 as shown in FIG. 8. The spring 74 is illustratively a compres- sion spring and is configured to urge the first spring mount 70 away from the second spring mount 72 in the second direction 104 and urge the panel actuator 25 to the unactu- ated state. This, in turn, causes the tension-status panel 30 to slide in the first direction 102 and to normally display the first indication 30A absent the predetermined load 100. In other embodiments, another spring type and configuration can be used such as a tension spring, a leaf spring, a torsion spring, etc.

In the illustrative embodiment, the attachment belt shown in FIGS. 4A-4D and used to attach the seat base 12 to the vehicle seat 11 with the belt retainer 18 is a vehicle seatbelt included in the vehicle seat 11. Other types of attachment belts can be used to attach the seat base 12 to the vehicle seat and such attachment belts may be used with or without the belt retainer 18. Another example of an attachment belt 15' that can be used to attach the seat base 12 to the vehicle seat 11 without the belt retainer 18 is shown in FIGS. 11A-11D. The attachment belt 15' includes a first anchor 110, a second anchor 112, a strap 114 interconnecting the first and second anchors 110, 112, and a strap adjuster 116. The first and second anchors 110, 112 are configured to attach to latch points included in the vehicle seat 11. Tension of the strap 114 can be adjusted by lengthening or shortening a length of the strap between the anchors 110, 112 using the adjuster 116 while the anchors 110, 112 are attached to the latch points. The strap 114 is routed across the belt path 23 and engages the load pads 24 to change the indications 30A, 30B, 30C displayed by the belt-installation indicators based on the amount of tension in the strap 114 and load on the belt path.

Figures 11A, 11B, 11C, 11D:
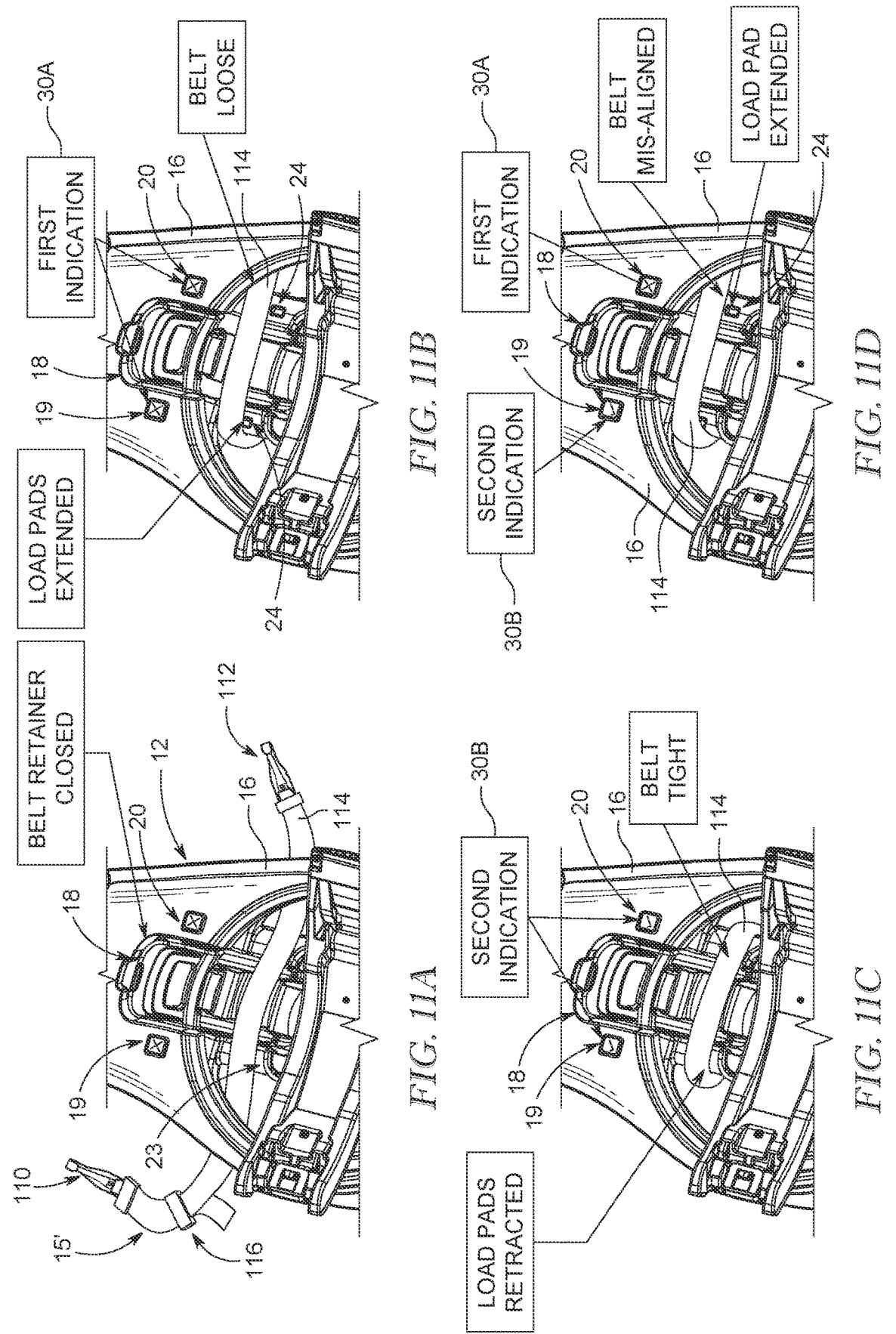
FIGS. 11A-11D are a series of perspective views of a portion of the seat base showing installation of another type of attachment belt without using the belt retainer and showing a change in indications based on a status of the installation of the attachment belt.

In some embodiments, a user may be able to cause a higher load on the belt path 23 with the attachment belt 15' as compared to the vehicle seatbelt 15. In some embodiments, the belt retainer 18 need not be used with the attachment belt 15' because the predetermined load can be achieved by a user without using the belt retainer 18 to clamp the strap 114. Accordingly, the strap 114 of the attachment belt 15' can be routed over the belt path 23 and the belt retainer 18, as shown in FIGS. 11B and 11C, and then adjusted to change the belt-installation indicators 19, 20 from the first indication 30A to the second indication 30B.

What is claimed is:

1. A child restraint comprising:
a juvenile seat configured to support a child for transportation in a vehicle and
a seat base adapted to rest on a vehicle seat and to secure the juvenile seat to the vehicle seat, the seat base including a seat-base foundation formed to include a belt path configured to receive an attachment belt to secure the seat base to the vehicle seat, a belt retainer moveable relative to the seat-base foundation between an opened position spaced from the belt path and a closed position clamped on the belt to retain the vehicle seat belt to the seat-base foundation, and a belt-installation indicator fixed to the seat-base foundation,
wherein the belt-installation indicator is configured to display a first indication when the attachment belt resides in the belt path and imparts a first load on the belt path less than a predetermined load while the belt retainer is in the opened position, and a second indication when the attachment belt resides in the belt path and imparts a second load on the belt path greater than or equal to the predetermined load while the belt retainer is in the opened position to indicate to a user when the attachment belt is installed in the belt path with at least the predetermined load.

2. The child restraint of claim 1, wherein the belt-installation indicator includes: (i) a tension-status panel coupled to and movable relative to the seat-base foundation between a first position in which the tension-status panel displays the first indication, and a second position in which the tension-status panel displays the second indication, and (ii) a panel actuator coupled to the tension-status panel and configured to change between an unactuated state when the attachment belt is separated from the belt path and an actuated state when the attachment belt resides in the belt path and imparts at least the predetermined load on the panel actuator to cause movement of the tension-status panel between the first position and the second position.

3. The child restraint of claim 2, wherein the panel actuator includes a panel mover coupled to the tension-status panel and configured to move the tension-status panel between the first position and the second position and a bias unit configured to establish the predetermined load and to urge the panel actuator toward the unactuated state to cause the tension-status panel to normally assume the first position so that the tension-status panel displays the first indication when belt installation on the belt path is incomplete.

4. The child restraint of claim 3, wherein the panel mover includes a load pad configured to engage and receive force from the attachment belt of the vehicle seat and a slider coupled between the load pad and the tension-status panel and movable relative to the load pad when the attachment belt is engaged with the load pad with at least the predetermined load to cause the tension-status panel to display the second indication.

5. The child restraint of claim 4, wherein the bias unit includes a first spring mount coupled to the slider, a second spring mount coupled to the seat base foundation, and a spring extending between and interconnecting the first and second spring mounts to urge the first spring mount toward or away from the second spring mount and urge the panel actuator to the unactuated state.

6. The child restraint of claim 4, wherein the bias unit is configured to urge the slider to translate in a first direction and the slider is configured to move the tension-status panel in a second direction opposite the first direction.

7. The child restraint of claim 4, wherein the panel actuator further includes an actuator lever interconnecting the slider and the tension-status panel, and the actuator lever is pivotable about a lever pivot axis to transfer movement from the slider to the tension-status panel.

8. The child restraint of claim 7, wherein the lever pivot axis is located between a first sliding plane of the slider and a second sliding plane of the tension-status panel such that movement of the slider along the first sliding plane in a first direction causes movement of the tension-status panel along the second sliding plane in a second direction different than the first direction.

9. The child restraint of claim 4, wherein the load pad includes a projection that extends into the belt path to engage the attachment belt and a pad arm coupled to the projection and to the seat-base foundation, and wherein the projection and the pad arm are pivotable about a load-pad pivot axis between an extended position projecting into the belt path and a retracted position at least partially removed from the belt path in response to the attachment belt engaging the projection and having at least the predetermined tensile force.

10. The child restraint of claim 9, wherein the slider includes an inclined ramp and the projection has a corresponding surface that engages the inclined ramp of the slider to cause sliding movement of the slider relative to the seat-base foundation as the projection moves from the extended position to the retracted position.

11. The child restraint of claim 1, wherein the belt-installation indicator is a first belt-installation indicator and is located on a first lateral side of the attachment belt retainer, and the seat base further includes a second belt-installation indicator located on a second lateral side of the attachment belt retainer and spaced apart from the attachment belt retainer and the first belt-installation indicator.

12. The child restraint of claim 1, wherein the seat-base foundation further includes a foundation cover and a foundation base, the foundation cover and the foundation base defining a foundation interior therebetween, and
wherein the belt-installation indicator includes: (i) a housing configured to couple to an underside of the foundation cover within the foundation interior to mount the belt-installation indicator to the seat-base foundation, (ii) a tension-status panel coupled to and movable relative to the housing between a first position in which the tension-status panel displays the first indication, and a second position in which the tension-status panel displays the second indication, and (iii) a panel actuator coupled to the tension-status panel and configured to change between an unactuated state when the attachment belt is separated from the belt path and an actuated state when the attachment belt resides in the belt path and imparts at least the predetermined load on the panel actuator to cause movement of the tension-status panel between the first position and the second position.

13. A child restraint comprising:

a juvenile seat configured to support a child for transportation in a vehicle and a seat base adapted to rest on a vehicle seat and to secure the juvenile seat to the vehicle seat, the seat base including a seat-base foundation formed to include a belt path configured to receive an attachment belt to secure the seat base to the vehicle seat, a belt retainer moveable relative to the seat-base foundation between an opened position spaced from the belt path and a closed position overlying at least a portion of the belt path, and a belt-installation indicator fixed to the seat-base foundation and spaced apart from the belt retainer, wherein the belt-installation indicator is configured to display a first indication when the attachment belt resides in the belt path and imparts a first load on the belt path less than a predetermined load while the belt retainer is in the closed position, and a second indication when the attachment belt resides in the belt path and imparts a second load on the belt path greater than or equal to the predetermined load while the belt retainer is in the closed position to indicate to a user when the attachment belt is installed in the belt path with at least the predetermined load, and wherein the belt-installation indicator is a first belt-installation indicator and is located on a first lateral side of the attachment belt retainer, and the seat base further includes a second belt-installation indicator located on a second lateral side of the attachment belt retainer and spaced apart from the attachment belt retainer and the first belt-installation indicator.

14. The child restraint of claim 13, wherein the attachment belt overlies the belt retainer and the belt path when the second indication is displayed.

15. The child restraint of claim 13, wherein the belt-installation indicator includes: (i) a tension-status panel coupled to and movable relative to the seat-base foundation between a first position in which the tension-status panel displays the first indication, and a second position in which the tension-status panel displays the second indication, and (ii) a panel actuator coupled to the tension-status panel and configured to change between an unactuated state when the attachment belt is separated from the belt path and an actuated state when the attachment belt resides in the belt path and imparts at least the predetermined load on the panel actuator to cause movement of the tension-status panel between the first position and the second position.

16. The child restraint of claim 15, wherein the panel actuator includes a panel mover coupled to the tension-status panel and configured to move the tension-status panel between the first position and the second position and a bias unit configured to establish the predetermined load and to urge the panel actuator toward the unactuated state to cause the tension-status panel to normally assume the first position so that the tension-status panel displays the first indication when belt installation on the belt path is incomplete.

17. The child restraint of claim 16, wherein the panel mover includes a load pad configured to engage and receive force from the attachment belt of the vehicle seat and a slider coupled between the load pad and the tension-status panel and movable relative to the load pad when the attachment belt is engaged with the load pad with at least the predetermined load to cause the tension-status panel to display the second indication.

18. A child restraint comprising:

a juvenile seat configured to support a child for transportation in a vehicle and a seat base adapted to rest on a vehicle seat and to secure the juvenile seat to the vehicle seat, the seat base including a seat-base foundation formed to include a belt path configured to receive an attachment belt to secure the seat base to the vehicle seat, a belt retainer moveable relative to the seat-base foundation between an opened position spaced from the belt path and a closed position overlying at least a portion of the belt path, and a belt-installation indicator fixed to the seat-base foundation and spaced apart from the belt retainer, wherein the belt-installation indicator is configured to display a first indication when the attachment belt resides in the belt path and imparts a first load on the belt path less than a predetermined load while the belt retainer is in the closed position, and a second indication when the attachment belt resides in the belt path and imparts a second load on the belt path greater than or equal to the predetermined load while the belt retainer is in the closed position to indicate to a user when the attachment belt is installed in the belt path with at least the predetermined load, wherein the belt-installation indicator includes: (i) a tension-status panel coupled to and movable relative to the seat-base foundation between a first position in which the tension-status panel displays the first indication, and a second position in which the tension-status panel displays the second indication, and (ii) a panel actuator coupled to the tension-status panel and configured to change between an unactuated state when the attachment belt is separated from the belt path and an actuated state when the attachment belt resides in the belt path and imparts at least the predetermined load on the panel actuator to cause movement of the tension-status panel between the first position and the second position, wherein the panel actuator includes a panel mover coupled to the tension-status panel and configured to move the tension-status panel between the first position and the second position and a bias unit configured to establish the predetermined load and to urge the panel actuator toward the unactuated state to cause the tension-status panel to normally assume the first position so that the tension-status panel displays the first indication when belt installation on the belt path is incomplete, wherein the panel mover includes a load pad configured to engage and receive force from the attachment belt of the vehicle seat and a slider coupled between the load pad and the tension-status panel and movable relative to the load pad when the attachment belt is engaged with the load pad with at least the predetermined load to cause the tension-status panel to display the second indication, and wherein the panel actuator further includes an actuator lever interconnecting the slider and the tension-status panel, and the actuator lever is pivotable about a lever pivot axis to transfer movement from the slider to the tension-status panel.

19. The child restraint of claim 18, wherein the lever pivot axis is located between a first sliding plane of the slider and a second sliding plane of the tension-status panel such that movement of the slider along the first sliding plane in a first direction causes movement of the tension-status panel along the second sliding plane in a second direction different than the first direction.

20. The child restraint of claim 17, wherein the load pad includes a projection that extends into the belt path to engage the attachment belt and a pad arm coupled to the projection and to the seat-base foundation, and wherein the projection and the pad arm are pivotable about a load-pad pivot axis between an extended position projecting into the belt path and a retracted position at least partially removed from the belt path in response to the attachment belt engaging the projection and having at least the predetermined tensile force, and wherein the slider includes an inclined ramp and the projection has a corresponding surface that engages the inclined ramp of the slider to cause sliding movement of the slider relative to the seat-base foundation as the projection moves from the extended position to the retracted position.

* * * * *